May 1, 1934. F. SCHNEIBLE 1,957,083
APPARATUS FOR DISPENSING BEER AND THE LIKE
Filed June 29, 1933
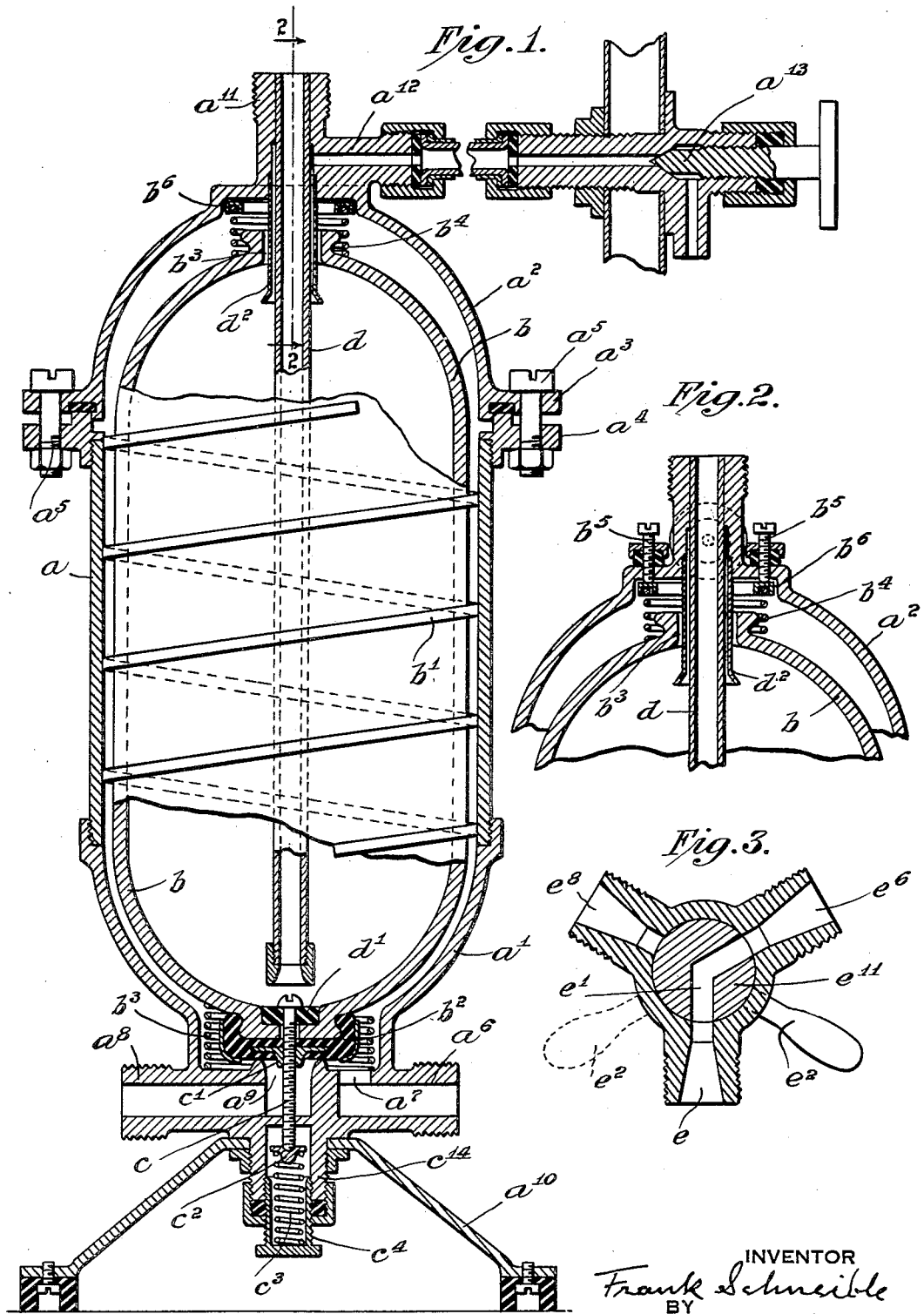
INVENTOR
Frank Schneible
BY
Redding, Greeley, O'Shea Campbell
ATTORNEYS Patented May 1, 1934

1,957,083

UNITED STATES PATENT OFFICE 1,957,083

APPARATUS FOR DISPENSING BEER AND THE LIKE

Frank Schneible, New York, N. Y.

Application June 29, 1933, Serial No. 678,132

19 Claims. (Cl. 225—40)

In another application of the present applicant for Letters Patent of the United States for beverage cooling apparatus, Serial No. 674,828 filed June 8, 1933, there was shown and described an apparatus particularly designed to meet the peculiar conditions which arise in the dispensing of fermented malt liquors, such as beer, in the dispensing of which conditions of temperature and pressure must be regulated carefully. In the apparatus so shown and described provision was made for final regulation of temperature and flow in a final cooling chamber in which the beer passed on its way to the dispensing faucet through a coil or a container surrounded by a cooling medium, such as a cold brine. It has been found that some advantages reside in the use of a container, that is, as distinguished from a coil, a vessel in which there can be held a more substantial volume of the beverage to be dispensed than can be held in a cooling coil of pipe. It has therefore been the object of the present invention to devise a beverage cooling container in which it shall be possible to cool and store for a considerable period of time a quantity of beer on its way to the dispensing faucet without any deleterious effects on the beer and by the operation of which the flow of beer can be regulated to meet the requirements of consumption and temperature. In accordance with the invention there is provided an outer shell or vessel, preferably of metal, which can be opened readily for inspection and cleaning, and an inner vessel, preferably of porcelain or glass, into which the beer is delivered from the keg or barrel, which is the source of supply, through a narrow space which separates the inner container from the outer shell and in which the beer, on its way to the inner container, is cooled through contact with the inner wall of the outer shell or vessel which is itself surrounded by the brine or other cooling medium employed. The inner container is supported within the outer shell in such manner that it may rise or fall with variation in its contents and in rising or falling may regulate the inflow of beer from the source of supply in accordance with the demands of consumption.

The invention will be more fully explained hereinafter and various details of advantage in its operation will be brought to attention, all with reference to the accompanying drawing in which the invention is shown as embodied in a convenient and practical structure, and in which:

Figure 1 is a view in vertical, central section, partly in elevation, of a container constructed in accordance with the invention.

Figure 2 is a detail view of the upper portion of the container, also in vertical section, but on a plane of section at right angles to that of Figure 1.

Figure 3 is a detail view in section of a three-way valve under control of the attendant for the purpose of directing the inflow of beer to the container under different conditions of operation.

In the embodiment of the invention illustrated, the outer shell of metal is preferably formed of a cylindrical portion $a$, a lower hemispherical or domed portion $a^1$ which may be secured to the cylindrical portion by screw threads as shown, and an upper hemispherical or domed portion $a^2$ which may be flanged, as at $a^3$, and secured to the cylindrical portion $a$ through the intermediary of a flanged ring $a^4$ threaded upon the cylindrical portion and bolts $a^5$ so that the domed top or cap may be removed readily to enable the inner container to be taken out and all parts cleaned thoroughly when desirable. The outer shell is provided, as at $a^6$, with a connection to the source of supply of beer to be dispensed, such connection communicating with the interior of the outer shell through a port $a^7$. It is also connected, as at $a$, with the source of supply which communicates with the interior of the shell through a port $a^9$, the inflow of beer through one connection or the other being controlled as hereinafter explained.

The outer shell may be supported upon a suitable base $a^{10}$.

The upper domed portion or cap $a^2$ of the outer shell is provided, as at $a^{11}$, with a connection to the dispensing faucet, not necessary to be shown, and with a vent connection, as at $a^{12}$, which may be controlled by the attendant through a vent valve $a^{13}$.

Within the outer shell $a$, $a^1$, $a^2$, is placed a floating inner container $b$, preferably of porcelain or glass, which is provided externally with a spiral rib $b^1$ whereby there is formed between the exterior of the inner container $b$ and the interior of the cylindrical portion $a$ of the outer container or shell a spiral channel through which the beer which enters from the source of supply finds its way into the inner container, as hereinafter explained, being cooled by contact with the cold shell $a$, which is itself cooled by contact with the cooling medium in the cooling chamber of the dispensing apparatus, the beer in the container $b$ being kept at the desired low temperature through contact with the cold exterior of the inner container.

The inner container is provided at its lower end with a valve plug $b^2$, of soft rubber or other suitable material, to coact with the inlet port $a^9$, as hereinafter explained, and is supported upon a cushioning spring $b^3$. For purposes of regulation the weight of the inner container $b$ and its contents may be balanced partially by a spindle $c$, here shown as engaged with the container by being threaded through a nut $c^1$, such spindle bearing at its lower end, through a cap $c^2$, upon a compression spring $c^3$, the tension of which may be regulated through a cap $c^4$ which is threaded into the lower end of the extension $c^{14}$ from the lower domed portion or bottom $a^1$ of the outer shell.

At its upper end the outer shell supports a beer discharge pipe $d$ which is extended downwardly within the inner container $b$ nearly to the bottom thereof where it may cooperate, for the purpose of controlling the discharge of beer from the container through the discharge pipe $d$, on its way to the dispensing faucet, with a valve plug $d^1$, of rubber or other suitable material, secured within the container $b$ at the bottom thereof, as by the head of the threaded spindle $c$. The top $a^2$ of the outer shell also has secured thereto a tube $d^2$ which is extended downwardly a short distance within the container $b$, being spaced from the discharge pipe $d$ so as to permit the escape of air or gas from the inside of the container $b$ through the vent $a^{12}$, $a^{13}$ under the control of the attendant. The tube $d^2$ is also spaced from the port $b^3$ in the upper end of the container $b$ so as to permit free inflow of beer from the space between the inner container $b$ and the outer shell $a$ into the container $b$. For purposes of regulation a compression spring $b^4$ is interposed between the top of the container $b$ and the upper end of the outer shell, the tension of this spring being regulated by screws $b^5$ which bear upon a spring collar $b^6$. For the purpose of enabling the operation of the apparatus to be controlled by the attendant under different conditions, the beer to be dispensed is admitted to the container, under control by the attendant, through a three-way valve, such as that shown in Figure 3, having a connection, as at $e$, to the source of supply of the beer which is delivered under air or gas pressure as usual, a connection, as at $e^6$, to the inlet $a^6$, $a^7$, a connection, as at $e^8$, to the inlet $a^8$, $a^9$ and a plug $e^{11}$ which has a channel $e^1$ and an operating handle $c^2$ whereby, at the will of the attendant, the source of supply may be connected to the outer shell through the inlet $a^6$, $a^7$ or through the inlet $a^8$, $a^9$.

In describing the operation of the container it may be assumed in the first instance that the supply switch or valve is as represented in Figure 3 so that the beer will flow from the keg or barrel or source of supply into the space between the outer shell $a$ and the container $b$ through the connection $a^6$ and the port $a^7$, being cooled in its passage through the spiral channel formed by the spiral rib $b^1$ between the inner container $b$ and the shell. As the beer rises in this space the still empty container $b$ floats on the rising beer until the valve plug $d^1$ makes contact with the lower end of the discharge pipe $d$, sealing the discharge pipe and preventing the passage of the beer to the dispensing faucet. When the space between the inner container and the shell has been filled completely and the inflow of beer continues the beer will flow into the inner container $b$, through the annular channel between the vent pipe $d^2$ and the larger port at the upper end of the container $b$, building up a counterpressure of the trapped air or gas in the container $b$ until such counterpressure equals the pressure under which the beer is delivered from the source of supply, when no more beer will enter or leave the container. At this point the attendant will open the vent valve $a^{13}$ and the air or gas will be released slowly from the inner container and with such release and reduction of pressure the flow of beer from the source of supply into the container $b$ will be resumed and when the beer accumulates in the container to such an extent that the buoyancy of the container is overcome, the container will sink to the bottom of the outer shell, moving the sealing disc or valve plug $d^1$ away from the bottom of the discharge pipe and permitting the flow of beer from the container $b$ to the dispensing faucet. Foaming of the beer in the apparatus may be obviated for free gas will collect in the upper part of the inner container $b$ and the recovered buoyancy of the container will cause it to rise, again closing the discharge pipe and shutting off the supply of beer to the dispensing faucet. When this occurs the attendant may then vent the apparatus through the vent valve $a^{13}$ and so again permit the passage of beer into the container and the resumption of the flow from the container to the dispensing faucet. Under normal conditions it is possible to draw the last glass of beer from the source of supply into the cooling container and then to draw the last of the beer out of the cooling container through the dispensing faucet. Under these conditions a fresh barrel of beer may be tapped and the dispensing of the beer continued as before.

The apparatus may also be operated as will now be described: with the supply switch $e$ in the position shown in Figure 3 the beer will flow through the inlet $a^6$, $a^7$ into the space between the inner container $b$ and the shell $a$, raising the inner container, sealing the discharge pipe $d$ and shutting off the flow of beer to the dispensing faucet. The beer, as before, continues to rise in the space between the inner container and the shell until it fills the space completely, enters the inner container and builds up therein a counterpressure, as before. If the vent valve $a^{13}$ is now opened the inner container, as before, sinks and opens the passage to the dispensing faucet. At this stage if the supply switch is turned to connect the source of supply to the space between the inner container $b$ and the shell $a$ through the inlet $a^8$, $a^9$ the inner container will be raised by the pressure of the beer, the inner container acting in cooperation with the inlet port $a^9$ as a pressure reducing valve with a differential which remains constant as long as the supply of beer from the source of supply continues. The beer thus admitted fills the space between the inner container $b$ and the shell $a$ and overflows into the inner container $b$, being cooler in its passage. As the buoyance of the inner container is lost the beer therein may pass to the dispensing faucet through the discharge pipe $d$.

It will be noted that when the barrel or source of supply is emptied, pressure cannot be built up in the inner container from the source of supply for as soon as the air or gas under pressure enters the space between the inner container and the shell it will cause all of the beer in such space to enter the inner container and the resultant of forces, due to the weight of the inner container itself plus the weight of the beer therein, seats the valve plug $b^2$ upon the port $a^9$ and prevents the further entry of gas under pressure into the apparatus.

Under this condition, in the absence of pressure within the container $b$, the beer will cease to flow to the dispensing faucet through the discharge pipe $d$, even though the inner container may then be full of beer. The attendant may then tap and connect a fresh barrel of beer, mixing it and drawing it at the dispensing faucet with the beer which remains in the inner container, or the beer remaining in the container may be completely withdraw. If it is determined to tap a fresh barrel and mix the beer therefrom and draw it from the container with the beer which remains therein, the pressure may be released from the old barrel and the fresh barrel connected. During the change from the old barrel to the fresh barrel the beer in the container cannot drain back out of the apparatus as the inlet port is then closed by the fallen container $b$, which then acts as a check valve. After the fresh barrel has been connected to the apparatus the valve or switch $e$ is turned to connect the barrel to the inlet $a^6$, $a^7$, the system is vented through the vent valve $a^{13}$ until the flow of beer at the dispensing faucet is resumed and the supply switch $e$ is then turned back to permit the flow of beer from the barrel into the inlet $a^8$, $a^9$.

If it is desired to empty the apparatus completely before the tapping of a fresh barrel the supply switch or valve $e$ is turned to connect the barrel to the inlet $a^6$, $a^7$ and the beer which remains in the container is discharged as before by the pressure admitted from the old barrel. When the new barrel has been connected the operation of the apparatus will be continued as previously described.

In explanation of the reducing valve action of the inner container with the supply switch turned so as to supply beer to the inlet $a^8$, $a^9$, it will be understood that at the beginning of the operation the inner container is in its lowest position, closing the port $a^9$ and is then raised by the inflowing beer. The pressure by which the inner container is pressed toward the port $a^9$ is equal to the actual weight of the container itself less the actual weight of the beer displaced by it in the space between the container and the shell. If the container is made of glass it has a specific gravity of about 3, while the specific gravity of beer is about 1, and if the weight of the inner container is 6 pounds the weight of the beer so displaced by the container when fully submerged and full of beer will be approximately 2 pounds. The pressure by which the inner container is held upon the port $a^9$ would then be about 4 pounds. If the area of the port $a^9$ is 1 square inch, then the inner container will act as a pressure reducing valve with a differential of about 4 pounds per square inch and the pressure of the beer in the container will be 4 pounds less than the pressure of the beer at the port $a^9$. For the purpose of regulating the pressure reducing action the tension of the spring $c^3$ may be varied by adjusting the cap $c^4$ to exert a lifting pressure against the container $b$ or the tension of the spring $b^4$ may be varied to vary the downward pressure exerted by it against the container. In this manner the pressure differentials may be varied to meet the requirements developed in the operation of the apparatus under different conditions.

In explanation of the advantages of the apparatus with respect to temperature control it may be said that excessive chilling of beer has a bad effect on the appearance and the quality of the beverage, chilled beer withdrawn into a glass for consumption being murky or cloudy in appearance and lifeless or flat.

These bad features are eliminated in the operation of the improved cooling container in which an ideal attempering action and resultant temperature control are established. During those periods in which there is very little or no demand on the cooling container, the beer contained in the spiral channel is being cooled through direct contact with the cold outer shell. The beer in the spiral channel cannot be excessively chilled as it in turn acts as a cooling medium on the inner container and the beer contained within the same, so that during such periods, the large body of beer within the inner container, the inner container itself and the small body of beer in the spiral channel are being cooled at practically the same rate and to the same temperature. At such times the beer within the inner container acts as an attempering agent and the entire volume of beer stored in the inner container and in the spiral spaces is being slowly and uniformly cooled and excessive chilling of the beverage in any part of the improved cooling container is prevented. In case of a sudden demand on the system the cold beer being withdrawn leaves the inner container through the discharge pipe and the beverage to be cooled enters the outer shell through one or the other of the ports as desired. The entering beverage comes into direct contact with the cold outer shell. The spiral rib on the inner container directs the flow of circulation so that the inflowing beverage contacts the entire inner surface of the cold shell and is cooled thereby and at the same time it contacts the entire outer surface of the inner container thus causing the inner container and the cold beer stored therein to act as an additional cooling agent on the inflowing beverage, while the inflowing beverage acts as an attempering agent on the cold beer stored in the inner container. The beverage withdrawn from the apparatus will be practically uniform in temperature, quality and appearance at all times.

It will be understood that various changes in the apparatus may be made to suit different conditions of use and that, except as pointed out in the accompanying claims, the invention is not limited to the particular construction and arrangement of parts shown and described herein.

I claim as my invention:

1. Apparatus for the dispensing of beer or the like comprising an outer shell, a container movable within the outer shell and spaced therefrom and having a port through which the beer may enter from said space, a discharge pipe supported by the outer shell and projected within the container, and means to supply beer to said space.

2. Apparatus for the dispensing of beer or the like comprising an outer shell, a container movable within the outer shell and spaced therefrom and having a port through which the beer may enter from said space, a discharge pipe supported by the outer shell and projected within the container, means to supply beer to said space, and means for regulating the movement of the said container.

3. Apparatus for the dispensing of beer or the like comprising an outer shell, a container movable within the outer shell and spaced therefrom and having a port through which the beer may enter from said space, a discharge pipe supported by the outer shell and projected within the container, means to supply beer to said space, and means for closing the discharge pipe when gas or air has accumulated in the said container.

4. Apparatus for the dispensing of beer or the like comprising an outer shell, a container movable within the outer shell and spaced therefrom and having a port through which the beer may enter from said space, a discharge pipe supported by the outer shell and projected within the container, means to supply beer to said space, and means carried by the said container and the discharge pipe to close the discharge pipe in the movement of the container.

5. Apparatus for the dispensing of beer or the like comprising an outer shell, a container movable within the shell and spaced therefrom and having a port through which the beer may enter from said space, a discharge pipe supported by the outer shell and projected within the container, and a valve plug carried by the container for coaction with the discharge pipe to close the same in the movement of the container.

6. Apparatus for the dispensing of beer or the like comprising an outer shell, a container movable within the outer shell and spaced therefrom and having a spiral rib to form a spiral channel in the space between the container and the shell and having a port through which the beer may enter from said space, a discharge pipe supported by the outer shell and projected within the container, and means to supply beer to said space.

7. Apparatus for the dispensing of beer or the like comprising an outer shell, a container movable within the outer shell and spaced therefrom and having a port through which the beer may enter from said space, means to apply controllable pressure to the container, a discharge pipe supported by the outer shell and projected within the container, and means to supply beer to said space.

8. Apparatus for the dispensing of beer or the like comprising an outer shell, a container movable within the outer shell and spaced therefrom and having a port through which the beer may enter from said space, a compression spring applied to the upper end of the container, and means to regulate the tension of said spring.

9. Apparatus for the dispensing of beer or the like comprising an outer shell, a container movable within the outer shell and spaced therefrom and having a port through which the beer may enter from said space, a compression spring in operative relation with the bottom of the container to apply upward pressure thereto, and means to regulate the tension of said spring.

10. Apparatus for the dispensing of beer or the like comprising an outer shell, a container movable within the outer shell and spaced therefrom and having a port through which the beer may enter from said space, a discharge pipe supported by the outer shell and projected within the container, means to supply beer to said space, and controllable means independent of the discharge pipe to vent the container.

11. Apparatus for the dispensing of beer or the like comprising an outer shell, a container movable within the outer shell and spaced therefrom and having a port through which the beer may enter from said space, a discharge pipe supported by the outer shell and projected within the container, said shell having two inlets for the admission of beer to said space and controllable means to direct the flow of beer into one inlet or the other.

12. Apparatus for the dispensing of beer or the like comprising an outer shell, a container movable within the outer shell and spaced therefrom and having a port through which the beer may enter from said space, a discharge pipe supported by the outer shell and projected within the container, said shell having two inlets for the admission of beer to said space, and a controllable three-way valve having one port to receive beer from a source of supply and two other ports to supply beer to one or the other of the inlet ports of the shell.

13. Apparatus for the dispensing of beer or the like comprising an outer shell having an inlet port, a container movable within the outer shell and spaced therefrom and having a port through which the beer may enter from said space, a discharge pipe supported by the outer shell and projected within the container, and means carried by the said container and coacting with the said inlet port to control the flow of liquid through said inlet port.

14. Apparatus for the dispensing of beer or the like comprising an outer shell having an inlet port, a container movable within the outer shell and spaced therefrom and having a port through which the beer may enter from said space, a discharge pipe supported by the outer shell and projected within the container, and means cooperating with the said container to control the pressure of the liquid passing through the said inlet port.

15. Apparatus for the dispensing of beer or the like comprising an outer shell having an inlet port, a container movable within the outer shell and spaced therefrom and having a port through which the beer may enter from said space, a discharge pipe supported by the outer shell and projected within the container, and means cooperating with the said container to regulate the head of pressure on the liquid in the said container and to maintain the head pressure at a constant reduced pressure relative to the pressure of the liquid in the supply system.

16. Apparatus for the dispensing of beer or the like comprising an outer shell having an inlet port, a container movable within the outer shell and spaced therefrom and having a port through which the beer may enter from said space, a discharge pipe supported by the outer shell and projected within the container, and means cooperating with the container to control the passage of gas or air through the inlet port into the said space.

17. Apparatus for the dispensing of beer or the like comprising an outer shell having an inlet port, a container movable within the outer shell and spaced therefrom and having a port through which the beer may enter from said space, a discharge pipe supported by the outer shell and projected within the container, and a valve plug carried by the container for coaction with said inlet port.

18. Apparatus for the dispensing of beer or the like comprising an outer shell having an inlet port, a container movable within the outer shell and spaced therefrom and having a port through which the beer may enter from said space, a discharge pipe supported by the outer shell and projected within the container, a valve plug carried by the container for coaction with said inlet port, and means to regulate the pressure of said valve plug against the inlet port.

19. Apparatus for the dispensing of beer or the like comprising an outer shell formed in detachable portions, a container movable within the outer shell and spaced therefrom and having a port through which the beer may enter from said space, a discharge pipe supported by the outer shell and projected within the container, and means to supply beer to said space.

FRANK SCHNEIBLE.